United States Patent [19]

Haruta et al.

[11] Patent Number: 4,722,090
[45] Date of Patent: Jan. 26, 1988

[54] EXCIMER LASER EQUIPMENT

[75] Inventors: Kenyu Haruta; Hitoshi Wakata; Yukio Sato; Haruhiko Nagai, all of Amagasaki, Japan

[73] Assignee: Mitsubishi Denki Kabushiki Kaisha, Tokyo, Japan

[21] Appl. No.: 839,145

[22] Filed: Mar. 12, 1986

[30] Foreign Application Priority Data

Mar. 18, 1985 [JP] Japan .................................. 60-52467
Apr. 29, 1985 [JP] Japan .................................. 60-92627

[51] Int. Cl.$^4$ .............................................. H01S 3/22
[52] U.S. Cl. ........................................ 372/57; 372/38; 372/59; 372/60; 372/33
[58] Field of Search ...................... 372/57, 89, 33, 38, 372/59, 60

[56] References Cited

PUBLICATIONS

Johnson et al.; "A Closed-Cycle Gas Recirculating System for Rare-Gas Halide Excimer Lasers"; Appl. Phys. Lett. 32 (5), 1 Mar. '78.

Primary Examiner—Leon Scott, Jr.
Attorney, Agent, or Firm—Burns, Doane, Swecker & Mathis

[57] ABSTRACT

The present invention relates to excimer laser equipment which is one kind of gas laser, and in particular to a rare gas-halide excimer laser using rare gases and halogens as laser media, and adapted to control the concentration of halogens contained in laser media therewithin on the basis of the result of the measurement of the concentration of halogens in the laser media which is being used for the oscillation of laser rays therein, whereby the stabilized oscillation of the laser is always possible.

13 Claims, 5 Drawing Figures

EXCIMER LASER EQUIPMENT

BACKGROUND OF THE INVENTION

1. Field of the Invention

The present invention relates to excimer laser equipment which is one kind of gas laser equipment, in particular to a rare gas-halide excimer laser equipment using rare gases and halogens as laser media.

2. Description of the Prior Art

A gas laser has advantages in that (1) a stable continuous oscillation is easily achieved; (2) oscillated lights are superior in monochromaticity, interferability, directivity and collectivity; (3) the oscillation central frequency is not dependent upon a circumferential temperature; (4) the oscillation wave length is easily stabilized; (5) several thousands of oscillation wave lengths are obtained from a vacuum ultraviolet range to a mm-wave range; (6) although usually an output being small in comparison with the size of the equipment, a volume of laser media can be increased, whereby an output can be increased; and the like.

An excimer laser, which is one kind of such gas lasers, is a high-efficiency and large-output shortwave laser which can be used as a power source for use in laser nuclear fusion, for use in an optical communication, and a light source for use in a communication in the sea or between the sea and the sky, for example the sea and artificial satellites.

It is, however, usually known that in a rare gas-halide excimer laser a laser pulse energy is gradually reduced with a repetition of oscillation, for example in a XeCl excimer laser using xenon (Xe) as a rare gas and chlorine (Cl) as a halogen, a laser pulse energy is reduced to about a half of the initial value after about $10^6$ times of pulse oscillation.

The main reason for the above described phenomenon is that halogen, which is one component of laser media, is described by the reaction upon materials, of which a laser housing is made, or spattered metals produced by an exciting electric discharge.

However, we do not have a simple apparatus or method for determining halogens, so that it has not been easy to determine the reduction of halogens contained in laser media. Accordingly, it has been difficult to determine a quantity of halogen to be added for making up for the loss of halogens, whereby when a laser pulse energy was reduced, all of laser media, which had been used in laser equipment, had to be replaced by fresh laser media or a part of the laser media had to be replaced by fresh laser media at an appointed time.

The conventional methods will be concretely described below with reference to FIG. 5 which schematically shows the conventional excimer laser equipment.

In FIG. 5, reference numeral 1 designates a laser housing, 5 designates a buffer diluted halogen gas-bomb, 9 designates a secondary pressure regulator, 16 designates a control system, 57 designates a laser beam, 58 designates a beam splitter, 59 designates a part of the laser beam, 60 designates a laser-output detector, and 61 designates a control system of flow rate.

In such conventional equipment, at first a part of the laser beam 57 is taken out as the part 59 of the laser beam by the beam splitter 58 and an output of the part 59 of the laser beam is measured by the laser-output detector 60. If the resulting measured value is reduced below the appointed value, the control system 16 actuates the control system of flow rate 61 to supply halogens from the buffer diluted halogen gas-bomb 5 through the secondary pressure regulator 9 until the laser-output is recovered.

However, since the change of the laser-output is influenced by a change of power source voltage, the instability of exciting electric discharge, the contamination of a laser pulse-taking out window, and the like, in addition to the above described reduction of the concentration of halogens, it is obvious that the change of the laser-output does not directly correspond to the change of the concentration of halogens. For example, also when the laser pulse energy is reduced due to the reduction of power source voltage, the control system supplies halogens on the assumption that the concentration of halogens was reduced, so the still further increased concentration of halogens is indicated. In this case, since halogens destabilize the electrical discharge, vicious cycles, in which the destabilization of exciting electrical discharge leads to the further reduction of the laser-output, whereby supplying a further excessive amount of halogens, are repeated. And, at last, not only the laser-oscillation itself is stopped but also the exciting electrical discharge is transferred to an arc, so that the problems such as an electrode being damaged, expensive halogens and rare gases being wastefully consumed, whereby increased operating cost, and the like, have occurred.

OBJECT OF THE INVENTION

The present invention was achieved in respect of the above described problems.

It is a first object of the present invention to provide excimer laser equipment, in which the stabilized laser oscillation can be always achieved by being supplied with halogens on the basis of the measured result of the concentration of halogens in laser media within the excimer laser equipment.

It is a second object of the present invention to provide excimer laser equipment, in which expensive halogens and rare gases are not wastefully consumed.

It is a third object of the present invention to provide excimer laser equipment, in which operating cost is low.

It is a fourth object of the present invention to provide a simply composed apparatus capable of easily measuring the concentration of halogens in laser media in order to achieve the above described objects.

The above and further objects and features of the invention will more fully be apparent from the following detailed description with the accompanying drawings.

DETAILED DESCRIPTION OF THE INVENTION

The present invention will be below described with reference to the drawings showing the preferred embodiments thereof.

Figure 1:
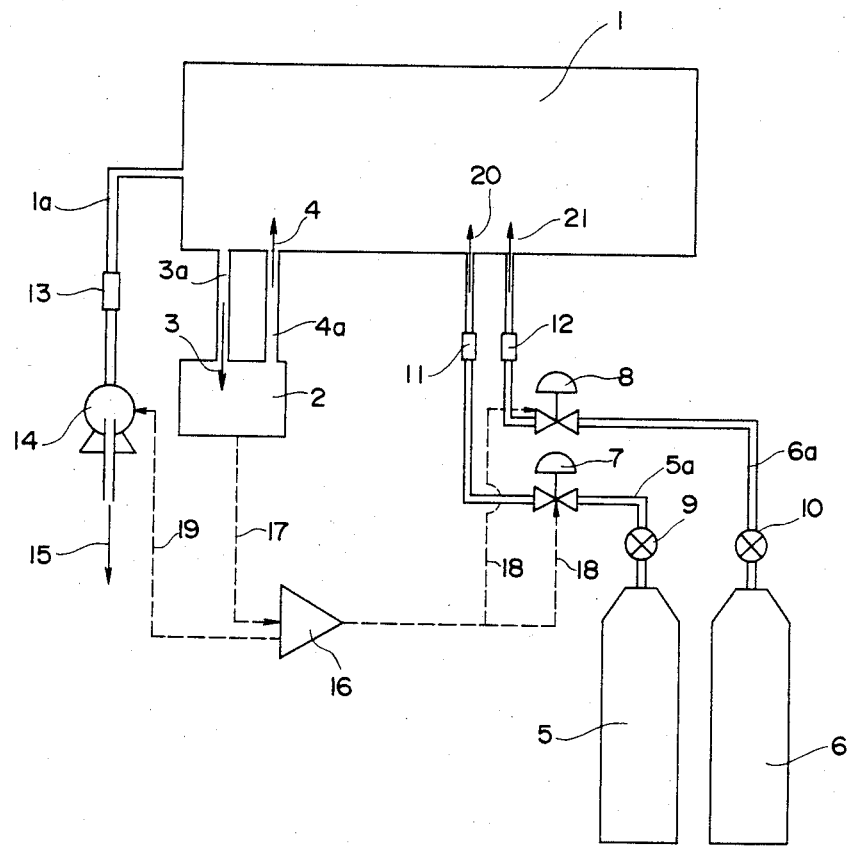
FIG. 1 is a schematic drawing illustrating one preferred embodiment of excimer laser equipment according to the present invention.

FIG. 1 is a schematic drawing showing, as a whole, a construction of excimer laser equipment according to the present invention, in which reference numeral 1 designates a laser housing, 2 designates a measuring apparatus connected to said laser housing 1 for measuring the concentration of halogens, being provided with a passage 3a for introducing laser media 3 to be measured thereinto from the laser housing 1 and with a passage 4a for returning measured laser media 4 into the laser housing 1, 5 designates a buffer diluted halogen (for example chlorine and the like) gas-bomb and 6 designates a buffer diluted rare gas (for example xenone gas and the like)-bomb. Electro-magnetic valves 7, 8, secondary pressure regulators 9, 10 and orifices 11, 12 are disposed in the midway portion of passages 5a, 6a connected to the laser housing 1 respectively. An exhaust passage 1a connected to the laser housing 1 is provided with an orifice 13 and a pump 14, and adapted to discharge an exhaust gas 15. A controller 16 is adapted to send a control signal 18 to the electro-magnetic valves 7, 8 and a control signal 19 to the pump 14 on the basis of a measured signal 17 from the apparatus 2 for measuring the concentration of halogens. A buffer diluted halogen gas 20 is being sent from the bomb 5, and 21 designates a buffer diluted rate gas being sent from the bomb 6.

Figure 2:
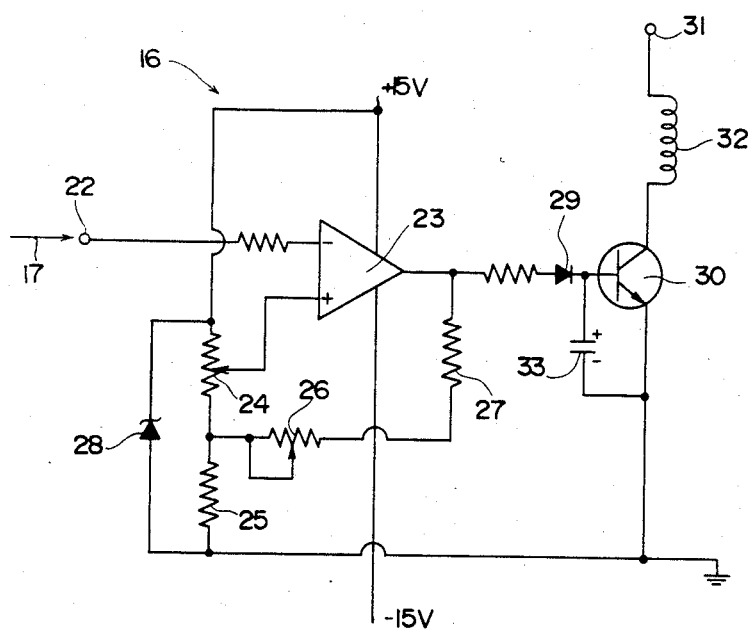
FIG. 2 is a circuit diagram of one preferred embodiment of a controller used in excimer laser equipment according to the present invention.

FIG. 2 is a circuit diagram showing an ON-OFF control system as one example of the controller 16, in which reference numeral 22 designates an input terminal of the measured signal 17 and is connected to a minus terminal of an operational amplifier (hereinafter referred to as an OP amplifier) 23. A plus terminal of the OP amplifier 23 is connected to a variable output terminal of a variable resistor 24. A variable resistor 26 and a resistor 27 are connected between a junction point of the variable resistor 24 and the resistor 25 and an output terminal of the OP amplifier 23. A zenerdiode is designated 28. The output terminal of the OP amplifier 23 is connected to a base of a transistor 30 through a diode 29. An input terminal 31 of a power source is for driving an electro-magnetic valve. Both terminals of an electro-magnetic coil 32 for driving the electro-magnetic valves 7, 8 are connected to a portion between said input terminal 31 of a power source for driving an electro-magnetic valve and a collector of the transistor 30. A capacitor 33 is connected to midway between the base of the transistor 30 and an emitter of the same.

Figure 3:
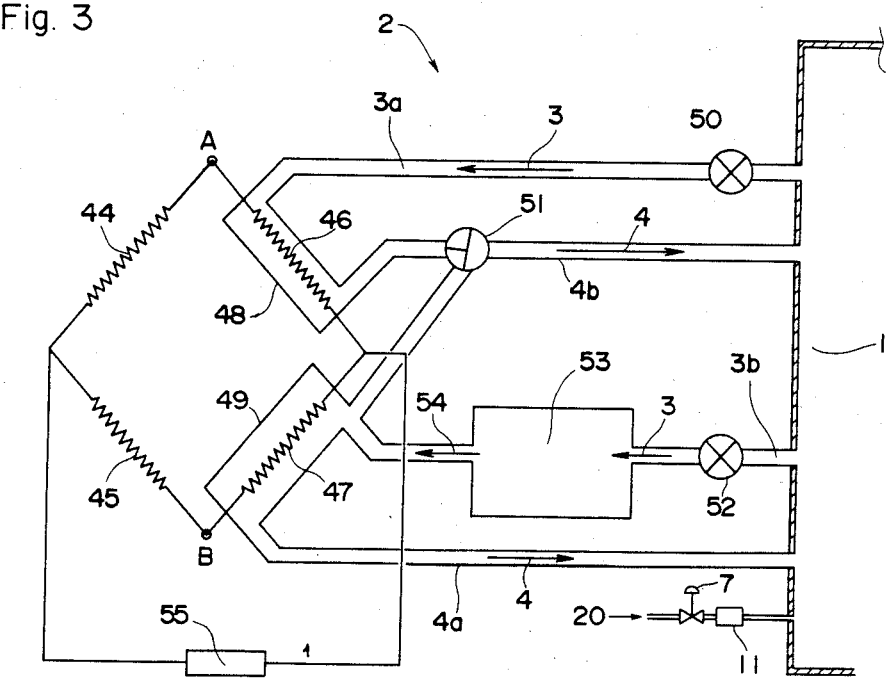
FIG. 3 is a schematic drawing illustrating a construction of an apparatus for measuring the concentration of halogens in laser media by a heat sensitive resistor.

FIG. 3 is a schematic drawing showing one preferred embodiment of the measuring apparatus 2 of the concentration of halogens in laser media, in which reference numerals 44, 45 designate resistors and 46, 47 designate heat sensitive resistors formed of materials, such as platinum and tungsten, having large temperature coefficients of electrical resistance, or a thermistor, a semiconductor element and the like. These resistances 44, 45 and heat sensitive resistors 46, 47 form a bridge circuit. The heat sensitive resistors 46 is disposed in a measuring cell 48, in which laser media to be measured are put, and the heat sensitive resistor 47 in a standard cell 49, in which laser media to be the standard composition for the judgment is put.

The measuring cell 48 and the standard cell 49 are provided with circulating passages 3a and 4b, 3b and 4a communicating with the laser housing 1, respectively. A two-way valve 50 is disposed in a portion 3a between the laser housing 1 and the measuring cell 48 of the circulating passages. Also, a three-way valve 51, whose one passage communicates with the standard cell 49, is disposed in a portion 4b between the measuring cell 48 and the laser housing 1. A two-way valve 52 and a halogen-removing device 53 are disposed in a portion 3b between the laser housing 1 and the standard cell 49 of the circulating passages in this order.

In addition, 54 designates a gaseous flow of laser media from which halogens were removed, 55 designates a power source of the resistors 44, 45, 46 and 47, and 56 designates a halogen gas to be supplied to the laser housing 1.

Figure 4:
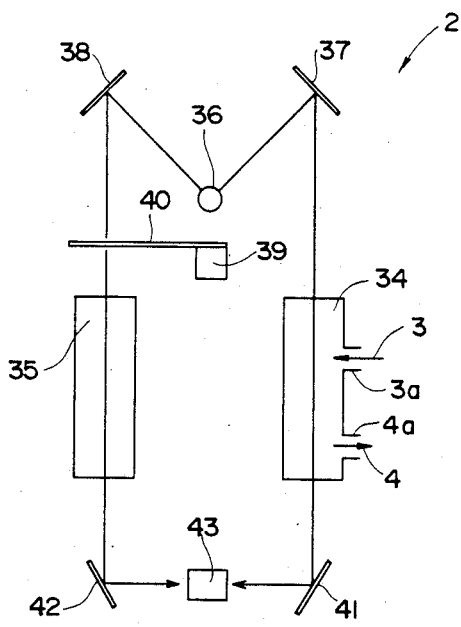
FIG. 4 is a schematic drawing illustrating an apparatus for optically measuring the concentration of halogens in laser media.
Figure 5:
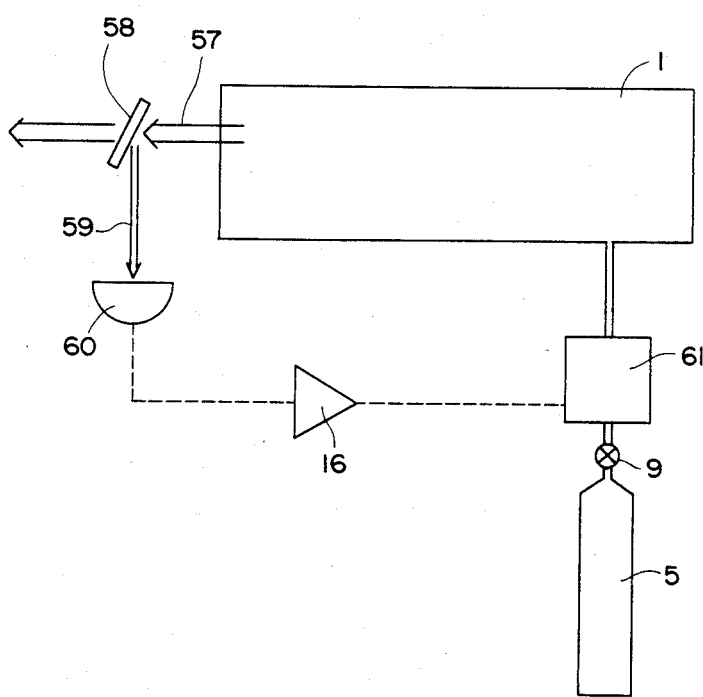
FIG. 5 is a schematic drawing illustrating a construction of the conventional excimer laser equipment.

FIG. 4 is a schematic drawing showing a construction of an optical measuring apparatus as another preferred embodiment of the measuring apparatus 2 for measuring the concentration of halogens, 34 designates a measuring cell in which laser media to be measured is put and 35 designates a standard cell in which laser media having standard composition for the measurement is put. A light source is designated 36. Lights radiated from this light source 36 being so reflected by mirrors 37, 38, passing through the measuring cell 34 and the standard cell 35, and then being reflected by mirrors 41, 42 as to be incident upon a detector 43, respectively. Lights reflected in the directions toward the measuring cell 34 and the standard cell 35 by above-mentioned mirrors 37, 38 are periodically cut off by a chopper 40 rotated by a motor 39 in a midway position between the mirrors 37, 38 and the measuring cell 34 as well as the standard cell 35.

Next, the operation of equipment according to the present invention constructed in the above described manner will be described.

Referring to FIG. 1, a part of the laser media housed in the laser housing 1 is introduced into the measuring apparatus 2 for measuring the concentration of halogens as laser media 3 and then returned to the inside of the laser housing 1 as measured laser media 4.

On the other hand, the measuring apparatus 2 for measuring the concentration of halogens puts out the resulting measured signal 17 to the controller 16. The controller 16 puts out the control signal 19 to the pump 14 on the basis of the measured signal 17 to drive the pump 14 for an appointed time, whereby a part of laser media in the laser housing 1 is discharged through the orifice 13 as the exhaust gas 15. At this time, since the laser media in the laser housing 1 are usually filled in the laser housing 1 so as to be under an appointed pressure higher than an atmospheric pressure, an appointed quantity of laser media can be discharged even by merely putting the orifice 13 in the exhaust gas flow as a flow-rate resistance to install an electro-magnetic valve in place of the pump 14 and opening and closing the electro-magnetic valve in a time-control manner.

Subsequently, the electro-magnetic valves 7, 8 are opened to introduce the buffer diluted halogen gas 20 and the buffer diluted rare gas 21 into the laser housing 1. At this time, the quantity of the above described gases introduced into the laser housing 1 can be accurately controlled by merely controlling a duration during which the electro-magnetic valves 7, 8 are opened by the action of the secondary pressure regulators 9, 10 and the orifices 11, 12. In this case, the concentration of halogens in the buffer diluted halogen gas-bomb 5 and the concentration of rare gases in the buffer diluted rare gas-bomb must be previously adjusted so that they may show an appointed concentration when mixed.

In the controller 16 as shown in FIG. 2, a voltage of +15 V supplied from a constant-voltage power source is further stabilized in the zenerdiode 28 and then divided by the variable resistor 24 and the resistor 25 to apply an appointed voltage to a plus terminal of the OP amplifier 23. If a voltage of the measured signal 17 to be put in the terminal 22 for putting in a measured signal exceeds the voltage applied to the plus terminal, an output voltage of the OP amplifier 23 is saturated to a plus side, whereby a base current flows through the transistor 30 and the transistor 30 is switched on. Thus, the electro-magnetic coil 32 for driving the electro-magnetic valves 7, 8 is excited to open the electro-magnetic valves 7, 8, whereby the buffer diluted halogen gas 20 and the buffer diluted rare gas 21 are introduced into the laser housing 1. If the concentration of halogens in the laser housing 1 reaches the predetermined value before long, a voltage of the measured signal 17 is reduced below the voltage applied to the plus terminal of the OP amplifier 23 and an output voltage of the OP amplifier 23 turns to minus side, whereby the transistor 30 is switched off and the electro-magnetic valves 7, 8 are closed.

The resistors 25, 27 and the variable resistor 26 are normal return circuits aiming at the sure ON-OFF action of the transistor 30. The diode 29 aims at the prevention of a reverse excessive signal from being applied to the transistor 30. The capacitor 33 aims at the reduction of a reverse electromotive force generated in the electro-magnetic coil 32.

In a measuring apparatus as shown in FIG. 3, at first the heat sensitive resistors 46, 47 are disposed in the measuring cell 48 and the standard cell 49 respectively, and the heat sensitive resistors 46, 47 are heated by sending an electric current i from the power source 55. When the laser media are introduced into the measuring cell 48 and the standard cell 49, the heat of the heat sensitive resistors 46, 47 is transmitted through the laser media by the heat conductive effect of the laser media to reach each cell, whereby the temperatures of the heat sensitive resistors 46, 47 are lowered and the electrical resistances of the heat sensitive resistors 46, 47 are reduced. However, the electrical resistances of the heat sensitive resistors 46, 47 are dependent upon the heat conductivity of media surrounding the heat sensitive resistors 46, 47. So, a bridge circuit is formed by the resistors 44, 45 and the heat sensitive resistors 46, 47 and the value of each resistor is selected so that the bridge may keep its balance, that is to say an electrical potential at a point A may be same as that at a point B, if the media having the same composition exists in the measuring cell 48 and the standard cell 49. Subsequently, when a laser medium is introduced into the measuring cell 48 and laser media from which only halogens were removed by the halogen-removing device 53, are introduced into the standard cell 49, the difference of heat conductivity due to the existence and nonexistence of halogens leads to different temperatures of the heat sensitive resistors 46, 47, whereby the bridge loses the balance and an unbalanced potential difference E is produced between the point A and the point B. The following relationship holds good among this unbalanced potential difference, the heat conductivity $\lambda$ of the laser media in the standard cell 49, the heat conductivity $\lambda'$ of the laser media in the measuring cell 48 and the temperature coefficient $\alpha$ of electrical resistances of the heat sensitive resistors 46, 47:

$$E \propto \alpha x (\lambda - \lambda')/\lambda$$

Since the concentration of halogens used in an excimer laser is usually 1% or less and the additivity corresponding to the concentration of each component holds good for the heat conductivity of the mixture medium in this concentration range, the concentration of halogens can be found by measuring an unbalanced potential difference.

The present invention has the novelty in that this measurement principle is applied to the measurement of the concentration of halogens in excimer laser equipment on the basis of the following ideas:

(i) As obvious from the above described relationship, the above described measuring method cannot obtain a sufficient sensitivity unless there is a large difference $\Delta\lambda$ in heat conductivity between a component to be measured and a buffer gas. Since, in gas chromatography, a sample gas is mixed in a carrier gas and the resulting mixture is introduced into a cell, the carrier gas having the heat conductivity greatly different from that of the sample gas can be optionally selected. However, in excimer laser equipment, a buffer gas, which is usually used, is helium (He) or neon (Ne) having the heat conductivity of $1.5 \times 10^7$ $Wm^{-1}K^{-1}$ and $4.9 \times 10^6 Wm^{-1}K^{-1}$ respectively, while hydrogen chloride (HCl) or flourine (F), which are used as halogens, have the heat conductivity of $1.4 \times 10^6 Wm^{-1}K^{-1}$ and $2.8 \times 10^6 Wm^{-1}K^{-1}$ respectively, there being a remarkably large difference between halogens and the buffer gas in heat conductivity. Accordingly, a remarkably high-sensitive measurement of the concentration of halogens can be achieved by merely introducing laser media as they are without using a carrier gas which is used in gas chromatography.

(ii) Since halogens can be very easily separated from rare gases and buffer gases, the zero-point adjustment can be made sure and the influence of rare gases upon the measurement can be obviated by using laser media from which only halogens were removed as a standard gas. That is to say, since xenon (Xe) and krypton (Kr), which are rare gases used in an excimer laser, have the heat conductivity of $5.6 \times 10^5 Wm^{-1}K^{-1}$ and $9.4 \times 10^5 Wm^{-1}K^{-1}$ respectively, the difference between them and buffer gases in heat conductivity is larger than that in the case of halogens, whereby even the slightest change of the concentration of these rare gases gives a great influence upon the measurement of concentration of halogens (in the gas chromatography rare gases and halogens are introduced into a cell with a time lag by passing through a filler column, so that there is not the possibility of such a problem). Accordingly, as described above, it is very useful that laser media, from which halogens were removed, per se are used as a standard gas.

(iii) In the above described measuring method, it takes 2 to 5 hours since being switched on to heat the heat sensitive resistors and reach a constant temperature (that is to say, until a zero base is stabilized) and it is necessary to continuously flow the carrier gas during this time in gas chromatography. In addition, if the supply of the carrier gas is stopped during the suspension of the measurement, the heat sensitive resistances are to be excessively heated to be burned off, so that in the cases where the continuous measurement is intended or the measurements are continued, the carrier gas must continuously flow, whereby the carrier gas is wastefully consumed.

In addition, in the present invention it is laser media, from which halogens were removed, that corresponds to a carrier gas in gas chromatography. However, if the measuring system is continuously under the operating conditions with returning these laser media to the cell, halogens in the laser housing are to be gradually reduced. So, the conventional idea of determining a zero base while continuously flowing a carrier gas and introducing a sample gas into the carrier gas is abandoned. That is to say, it is possible to hold the measuring system in readiness under the operative conditions without consuming the gas by such a manner that a first laser media containing halogens flow through a measuring cell and a standard cell, the measuring system being under the operative conditions with returning these media to a laser housing, and a laser media, from which halogens were removed, being introduced into the standard cell only when the measurement is carried out, whereby an unbalanced voltage is produced.

A gas-introducing portion of the measuring apparatus 2 for measuring the concentration of halogens as shown in FIG. 3 is adapted so as to achieve these three ideas and the operation of the apparatus 2 is as follows:

At first, in the zero-point adjustment, the two-way valve 50 is opened and the three-way valve 51 is opened in the direction of connecting the measuring cell 48 to the standard cell 49. Subsequently, the two-way valve 52 is closed, whereby the laser medium 3 is circulated and returned to the laser housing 1 through the measuring cell 48 and the standard cell 49.

In the measurement of the concentration of halogens contained in the laser medium within the laser housing 1, the three-way valve 51 is opened in the direction of connecting the measuring cell 48 to the laser housing 1 to make the laser media 3 within the laser housing 1 circulate in the measuring cell 48 only, and simultaneously, the two-way valve 52 is opened, whereby the laser media 3 within the laser housing 1 is passed through the halogen-removing device 53, and thus, the resulting laser media 54, from which only halogens were removed, is introduced into the standard cell 49. At this time, since a gas returned to the laser housing 1 from the standard cell 49 does not contain halogens, the electro-magnetic valve 7 is opened to replenish halogen gas 20. However, since practically the measurement of the concentration of halogens can be carried out within a remarkably short time (minimum ten and several seconds) and a small flow rate (several tens to several hundreds cc mm$^{-1}$) of gas is required, the concentration of halogens within the laser housing 1 hardly changes even though the halogen gas 20 is not replenished.

A separate circulating pump may be used as power for circulating these media, a differential pressure between the discharge side and the suction side of such a fan may be utilized since laser media must be circulated within a housing when the oscillation of a pulse is repeated in excimer laser equipment and usually a line flow fan and the like are provided.

Absorbents such as soda lime, activated carbon, zeolite and silica gel, getter materials such as titanium, calcium and zirconium and a cooling trap may be used as the halogen-removing device 53.

In addition to the above described construction, the following construction may be adopted, too.

Since of laser media used in an excimer laser the concentration of rare gases and buffer gases is not changed so much as the concentation of halogens, a mixture of media comprising rare gases and buffer gases having the same concentration as that in the laser may be prepared to pass through the standard cell 49 or the above described mixture of media may be enclosed in the standard cell 49 under the condition that the value of an electric current flowing through the heat sensitive resistor 47 is reduced so as to prevent an excessive heating (since an unbalance potential difference is proportional to the value of an electrical current in accordance with Ohm's law, the measuring sensitivity is reduced). At this time, since the measuring sensitivity is reduced in comparison with that in the above described preferred embodiment and in fact also the concentration of rare gases is slightly changed, the accuracy is reduced but the measuring system can be more simplified.

In addition, since the temperature of the laser media 4 discharged from the measuring cell 48 has been already risen to some degree, when the laser media 3 is circulated from the measuring cell 48 to the standard cell 49 during the time excepting the measurement, strictly speaking, the temperature difference of introduced gases gives an influence upon the measurement of the concentration of halogens in addition to the existence or the nonexistence of halogens when the media 54, from which halogens were removed, is introduced into the standard cell 49 in the measurement. In order to avoid this, a suitable heating source may be provided in an introduction passage for the media 54, from which halogens were removed, or a passage 3a for introducing the laser media 3 into the standard cell 49 during the time excepting the measurement in addition to the passage for introducing the laser media 3 into the measuring cell 48.

On the other hand, in the case where the optical measuring apparatus 2 for measuring the concentration of halogens is used, the operation is carried out as follows:

Lights radiated from the light source 36 are reflected by the mirrors 37, 38, respectively, passed through the measuring cell 34 and the standard cell 35, reflected again by the mirrors 41, 42, and then put in the detector 43. Two lights are periodically cut off by the chopper 40 being rotated by means of the motor 39 to be switched on and off and enter the detector 43 alternately. A gaseous mixture having the same composition as the initial composition of a laser media in the laser housing 1 is introduced into the standard cell 35, and the laser media 3 to be measured is introduced into the measuring cell 34, whereby a voltage corresponding to the reduction of halogens is detected by the detector 43 in the form of an alternating-current signal.

Here, absorption spectrums used in the above described optical measuring apparatus 2 for measuring the concentration of halogens will be described.

A continuous absorption spectrum having an absorption maximum at 290 nm as shown in for example p. 1295, Fundamental Edition II, Chemical Handbook (Maruzen, 1975) is useful for fluorine gas, and an ultraviolet absorption spectrum from 100 nm to 220 nm as reported in for example J. A. Myer: J. Chem. Phys. vol. 52, No. 1, 266 (1970) or vibration spectrums 2,886 cm$^{-1}$ ($V=O\rightarrow V=1$); 5,668 cm$^{-1}$ ($V=O\rightarrow V=2$); 8,374 cm$^{-1}$ ($V=O\rightarrow V=3$); 10,923 cm$^{-1}$ ($V=O\rightarrow V=4$), and the like, as shown in page 83, The Structure Of Molecules written by G. M. Barrow and translated by Akira Shimada (Kagaku Dojin, 1965) for hydrogen chloride gas.

A tungsten filament lamp, a hydrogen glow-tube, a heavy hydrogen glow-tube, a high-pressure mercury lamp, a xenon lamp and the like can be as the light source 36. In an infrared range (corresponding to vibration spectrums) a glower, a Nernst glower, a gas-mantle carbon rod, a tungsten ribbon semiconductor laser and the like can be used. In addition, a photocell and a photomultiplier tube are used as the detector 43. In an infrared range a thermocouple, a bolometer, a Golay cell, a photoconductive cell and the like can be used.

Also in this optical measuring apparatus 2 for measuring the concentration of halogens a laser media to be measured, from which only halogens were removed, may be introduced into the standard cell 35 in the same way as to the case of the above described measuring apparatus for measuring the concentration of halogens using a heat sensitive resistance to take out a signal corresponding to an absolute quantity of halogen. In this case, a halogen gas may be added anew to a gas discharged from the standard cell 35 (the quantity of the halogen gas to be added anew is controlled by a measured signal) and then may be returned to the laser housing 1.

In addition to the above described preferred embodiments, an excimer laser using argon gas, fluorine gas and buffer gases as laser media has a transmission wave length of 193 nm, and an excimer laser using krypton, fluorine and buffer gases as laser media has a transmission wave length of 248 nm, that is to say, both wave lengths exist within a continuous absorption spectrum of fluorine with 290 nm as a peak, so a part of an output of these lasers can be used as a light source for use in the measurement of fluorine gas.

In addition, since an excimer laser is usually used in such a manner that a laser ray having a wave length in a range from 193 nm to 351 nm is taken out by changing laser media in a single housing, the measurement is possible even though either halogen is used by using a light source having a light-radiating wave length within a range where the above described continuous absorption spectrum having an absorption maximum at 290 nm of fluorine and the above described ultraviolet absorption spectrum ranging from 100 nm to 220 nm of hydrogen chloride overlap each other. That is to say, it is unnecessary to use two light sources, so that the use of an excimer laser is rational.

Although an on-off control was shown as one example of a controller as shown in FIG. 2, a controller such as a porportional control, an integration control, a differential control and a PID control may be used. In addition, every optical measuring apparatus of another construction provided with a light source and a detector for detecting a difference between a gas to be measured and a standard gas in light-absorptivity may be used.

In the same way an element having a function of controlling a flow rate may be used as a method of introducing halogens and rare gases in place of an on-off control of an electro-magnetic valve.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. In an excimer laser which uses a mixture of a rare gas, halogen gas and a buffer gas as a lasing medium, the mixture including respective concentrations of each of the rare, halogen and buffer gases, an apparatus for controlling the concentration of the halogen gas in the mixture, comprising:
    means for measuring the concentration of the halogen gas in the mixture used as the lasing medium, wherein the measuring means generates a signal corresponding to the halogen concentration;
    means for regenerating the mixture used as the lasing medium; and
    means for controlling the regenerating means in accordance with the signal from the measuring means.

2. The apparatus of claim 1, wherein the means for measuring the concentration of the halogen gas in the mixture used as the lasing medium comprises:
    a resistance bridge circuit comprising at least one heat sensitive resistor disposed in a standard gas cell and at least one heat sensitive resistor disposed in a measuring gas cell;
    means for detecting an imbalance in the resistance bridge circuit;
    a first piping connected to the excimer laser for introducing a first portion of the mixture into the measuring gas cell; and
    a second piping for introducing a second gas mixture containing no halogen gas into the standard gas cell.

3. The apparatus of claim 2, wherein the second gas mixture includes concentrations of the rare gas and the buffer gas which are substantially equal to the respective concentrations of the mixture used as the lasing medium in the excimer laser.

4. The apparatus of claim 2, wherein the means for measuring the concentration of the halogen gas in the mixture used as the lasing medium further comprises a material for removing halogens, and wherein the second gas mixture is a second portion of the mixture in the excimer laser, the second portion having passed through the removing material.

5. The apparatus of claim 4, wherein the removing material is a solid substance which forms fixed halogenides.

6. The apparatus of claim 2, wherein the second gas mixture is a second portion of the mixture used as the lasing medium in the excimer laser, the second portion having passed through a cooling trap.

7. The apparatus of claim 1, wherein the means for measuring the concentration of the halogen gas in the mixture used as the lasing medium includes:
    means for emitting light;
    a measuring gas cell for confining a first portion of the mixture used as the lasing medium in the excimer laser;
    a standard gas cell for confining a second gas mixture, the second mixture having concentrations of the rare and buffer gases which are substantially equal to the respective concentrations of the mixture used as the lasing medium;
    means for directing the light through the measuring gas cell and the standard gas cell; and means for comparing a first intensity of light transmitted by the measuring gas cell and a second intensity of light transmitted by the standard gas cell.

8. The apparatus of claim 1, wherein the means for regenerating the mixture used as the lasing medium replaces a part or all of the mixture in the excimer laser with fresh mixture.

9. The apparatus of claim 8, wherein the means for controlling the regenerating means turns the regenerating means ON or OFF.

10. The apparatus of claim 1, wherein the means for regenerating the mixture used as the lasing medium adds a suitable quantity of the halogen gas to the mixture used as the lasing medium in the excimer laser.

11. The apparatus of claim 10, wherein the means for controlling the regenerating means turns the regenerating means ON and OFF.

12. The apparatus of claim 1, wherein the means for regenerating the mixture used as the lasing medium adds suitable quantities of the halogen and rare gases to the mixture in the excimer laser.

13. The apparatus of claim 12, wherein the means for controlling the regenerating means turns the regenerating means ON or OFF.

* * * * *